United States Patent

[11] 3,562,439

[72] Inventor Leo K. Lugten
Riverside, Calif.
[21] Appl. No. 739,388
[22] Filed June 24, 1968
[45] Patented Feb. 9, 1971
[73] Assignee Electronic Communications, Inc.

[54] TELEPHONE IN-BAND SIGNALLING SYSTEM
5 Claims, 3 Drawing Figs.

[52] U.S. Cl. .......... 179/84
[51] Int. Cl. .......... H04m 1/50
[50] Field of Search .......... 179/84 (VF)

[56] References Cited
UNITED STATES PATENTS
2,765,371 10/1956 Fritschi et al. .......... 179/84VF
3,306,984 2/1967 Leonard .......... 179/84VF

*Primary Examiner*—Kathleen H. Claffy
*Assistant Examiner*—William A. Helvestine
*Attorney*—Hopgood and Calimafde

ABSTRACT: A telephone inband signalling system converts first and second DC signal levels by detecting a change in either direction between the signals to produce a voltage of predetermined time duration which exceeds the time between dial pulses. This latter voltage is employed to simultaneously (a) short the voice path, thereby preventing feedback to the calling party, and (b) enhance the tone of a 2600 hz. oscillator. The oscillator is then "on-off"-ed in response to the dial pulses coming over the input. At the end of the conversation, a muted 2600 hz. tone is continuously transmitted indicating an idle line.

INVENTOR.
LEO K. LUGTEN
BY
Hopgood & Calimafde
ATTORNEYS

INVENTOR.
LEO K. LUGTEN

BY Hopgood & Calimafde
ATTORNEYS

INVENTOR.
LEO K. LUGTEN
BY
Hopgood & Calimafde
ATTORNEYS

TELEPHONE IN-BAND SIGNALLING SYSTEM

BACKGROUND OF THE INVENTION

When it is intended to multiplex telephone lines for the purpose of transmission over the air or through an electromagnetic wave sustaining medium such as coaxial cable, dial pulses which normally appear as DC levels must be put in such a form that they can be handled by the communication equipment. The DC voltage levels are therefore converted into audio frequency signals, for example at 2600 hz. This is known as inband signalling. The equipment would be set up to transmit the 2600 hz signal in each channel.

Conventional inband signalling transmitters employ one or more relays in conjunction with an oscillator, to generate the audio frequency signal. Relays, however, require a great deal of maintenance and significantly contribute to signal distortion.

While research emphasis has been placed upon the elimination of relays in order to enhance reliability, present circuits tend to be overly complex in endeavoring to satisfy input and output isolation and impedance considerations and the functional requirements which go with good reliability and high signal-to-noise ratio.

OBJECTS OF THE INVENTION

Accordingly, it is the object of this invention to provide an inband signalling system which is simple and economical to manufacture and maintain which avoids the use of moving parts, such as found in relays, and which is capable of the following functions.

a. providing a continuous signal indicating an idle line;
b. providing an enhanced signal for purposes of dial pulse signalling;
c. isolating the input and output;
d. preventing the feedback of signals to the calling party;
e. preventing the introduction of office noise in the signalling line; and
f. providing for the balanced-to-unbalanced conditions normally associated with line cutting during DC signalling.

SUMMARY OF THE INVENTION

Briefly, the telephone inband signalling system of the invention converts first and second DC voltage levels into inband AC signals by detecting a change between the DC voltage levels and issuing a signal of predetermined duration. This signal is employed to simultaneously (a) interrupt the input to the voice frequency path (the input and output being isolated from one another) and (b) enhance the AC signal which is injected into the path output. A switch responsive to the DC signalling voltage is caused to interrupt the enhanced AC signal during a predetermined DC voltage level at the input, thereby producing AC signalling.

The above mentioned and other features and objects of this invention and the manner of attaining them will become more apparent and the invention itself will best be understood by reference to the following description of an embodiment of the invention taken in conjunction with the accompanying drawings, the description of which follows.

DETAILED DESCRIPTION OF THE DRAWINGS

DETAILED DESCRIPTION OF THE INVENTION

Figure 1:
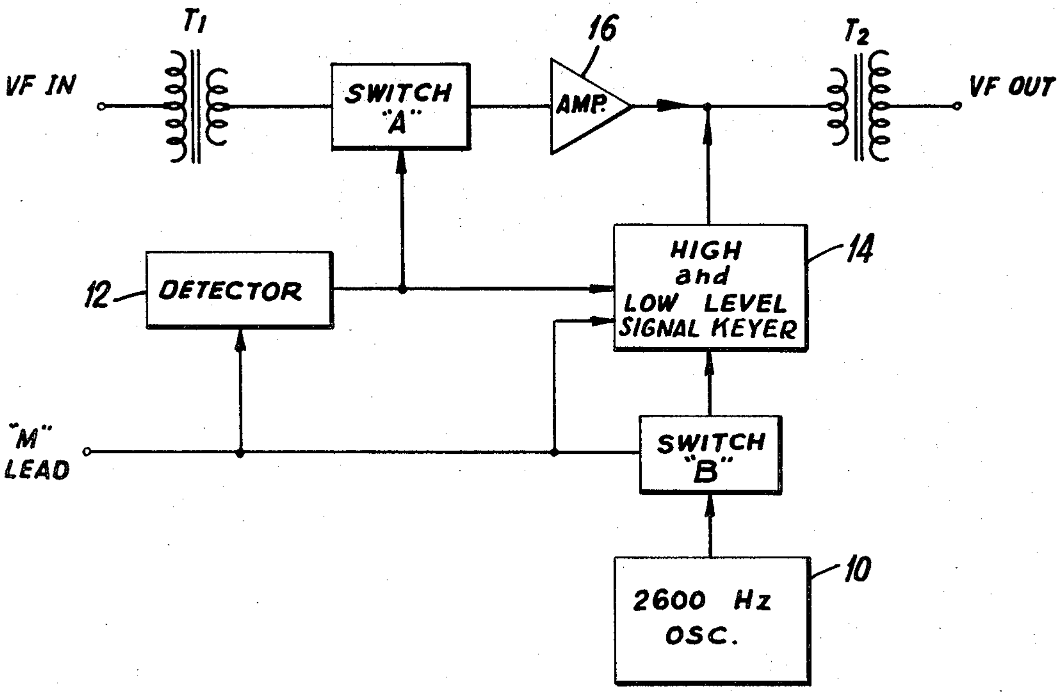
FIG. 1 is a block diagram of the circuit of the invention.
Figure 3:
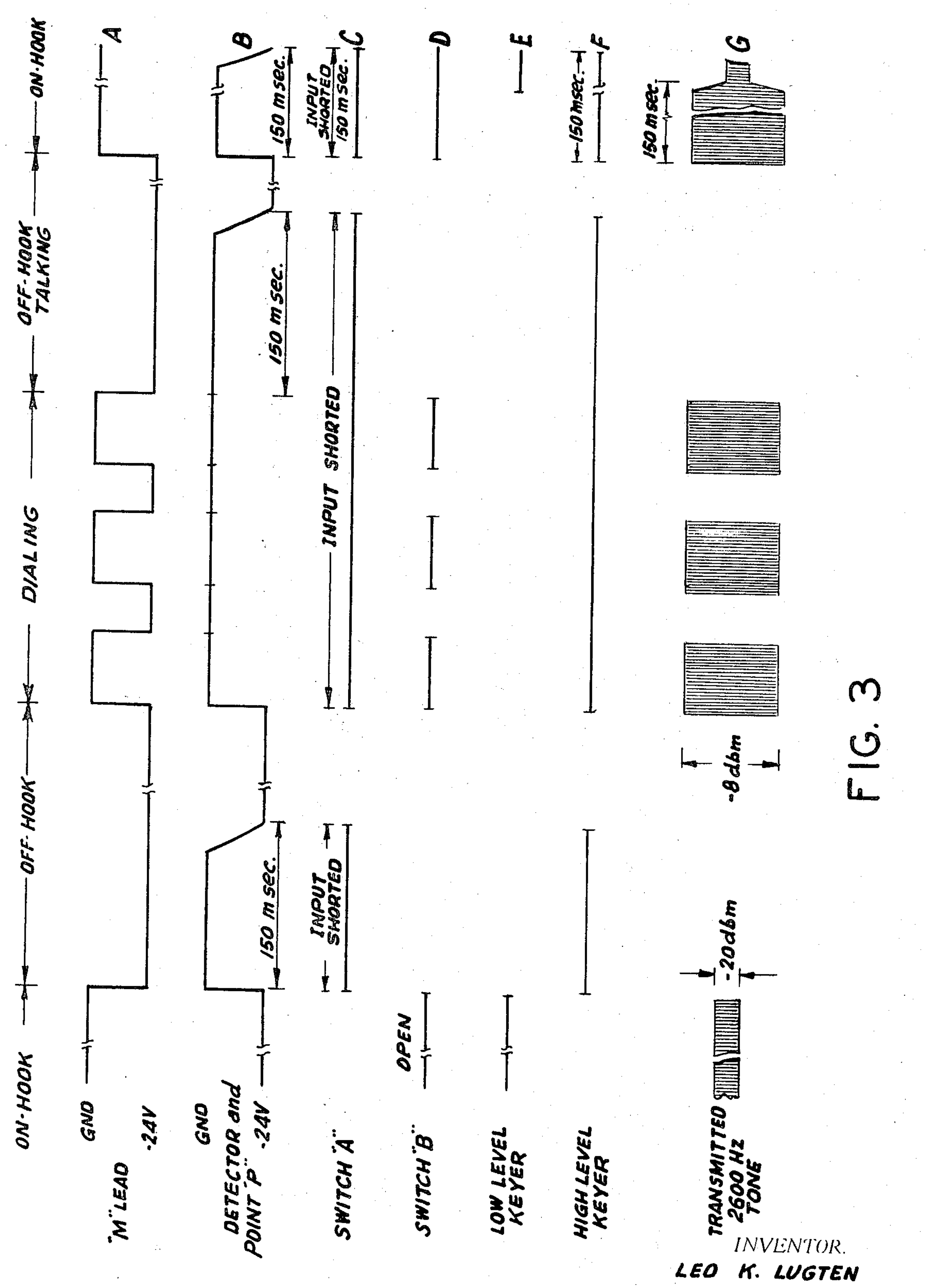
FIG. 3 is a graphic representation of voltages appearing at various points in the circuit of FIG. 2.

DC signal voltages to which the instant equipment responds appear via a particular subscriber over what is conventionally called the M lead (FIG. 1). As shown in FIG. 3, when the telephone is in the "on-hook" condition, the M lead is normally at ground. In the "off-hook" condition, the M lead potential rises in the negative sense to −24 volts and on dialing (actually upon return of the dial), the DC voltage varies as shown between these two limits. The dialing pulse rate is 8pps., nominally 100 milliseconds between pulses. This time factor, as will be seen, is carefully taken into consideration by the invention.

The 2600 hz signalling source is provided by oscillator 10 (FIG. 1) which may be any conventional oscillator which will fulfill the functional requisites to be described. The 2600 hz tone, as will be appreciated by those versed in the art, falls into the band normally associated with telephone equipment (300-—3400 hz). A single oscillator may feed the multiplex channels simultaneously, while each channel supports a separate conversation between remote exchanges between two subscribers.

Describing the invention generally at first: when the calling party is "on hook" the M lead is at ground maintaining switch B and a low level signal keyer 14 on. A 2600 hz tone at approximately −20 dbm will be transmitted as shown in FIG. 3.

When a calling party seizes the circuit, the M lead potential drops to −24 volts and switch B is turned off; the 2600 hz tone disappearing. The negative transient of the M lead is differentiated and triggers a detector 12 whose output is grounded for about 150 msec. (FIG. 3). Switch A simultaneously shorts the input path thereby preventing office noise from interfering with the signalling.

When the calling party dials, the M lead varies between −24 volts and ground. Upon the first transition from −24 volts to ground, detector 12 is triggered and will stay on for the duration of the dial pulses s since its time decay as will be seen exceeds the dial pulse rate. Switch A is turned on again, shorting the input.

The time that the M lead is at ground is defined as the break period and during this period, switch B and high level keyer 14 are turned on. The dialing signal is thus transmitted at an augmented or enhanced level (−12 12 db) improving the singal-to-noise environment.

When the calling party hangs up, the M lead goes "on hook" and switch B and high level keyer 14 are turned for 150 msec. to give the receiving party an unmistakeable indication that the conversation is ended and he may therefore return his receiver to the "on hook" position. An amplifier 16 is provided to negative insertion losses introduced by input and output transformers $T_1$ and $T_2$.

Figure 2:
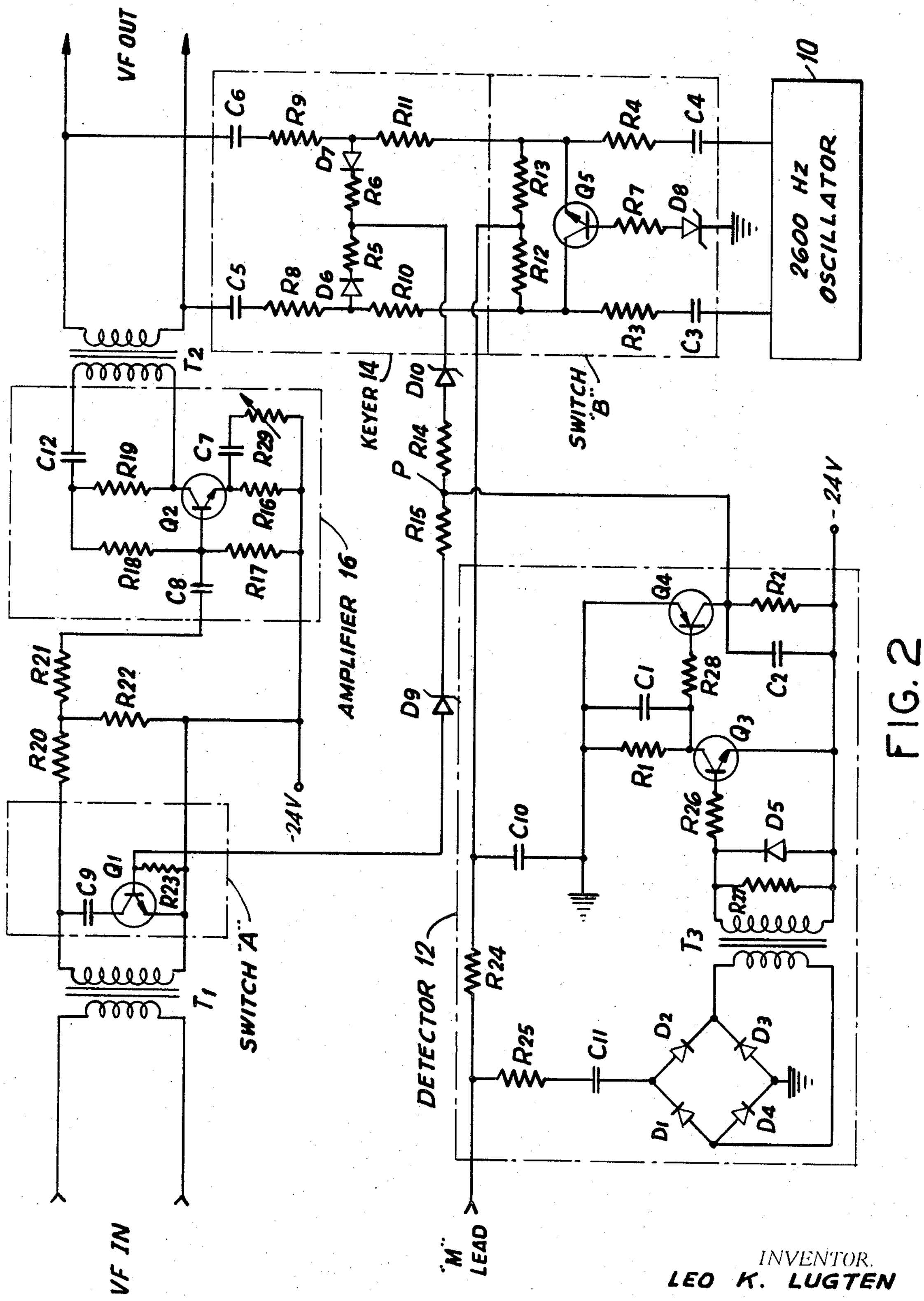
FIG. 2 is a detailed schematic of the block diagram shown in FIG. 1.

Turning now to FIGS. 2 and 3, the circuitry of the invention will be described in detail.

The M lead transitions are differentiated, and the negative as well as the positive transitions detected, by means of diodes $D_1$ through $D_4$ arranged in a bridge configuration. For each transition, a positive spike will trigger transistor $Q_3$, via transformer $T_3$, which in turn turns on transistor $Q_4$. Capacitors $C_1$ and $C_2$ in conjunction with their parallel resistors $R_1$ and $R_2$, respectively, provide time constants for maintaining transistor $Q_4$ conducting for 150 msec, each time it is switched on.

The switching on of transistor $Q_4$ places junction point P at ground. Point P therefore will always be at ground so long as the detector signal (which in this case is a ground signal) appears.

The detector signal (ground) biases transistor $Q_1$ to conduct, thereby shorting the input. It simultaneously backward biases diodes $D_6$ and $D_7$ in keyer 14, thereby enhancing the output of oscillator 10. As will be seen, depending upon the condition of transistor $Q_5$, this tone will or will not reach the line.

Upon the "off hook" condition when the subscriber lifts his phone, transistor $Q_4$ is turned on for 150 msec. grounding P for this time constant. Transistor $q_1$ (switch A) is also turned on shorting the input and obviating any feedback or office noise introduction on the signalling line. Transistor $Q_5$ (switch B) is also turned on (because the M lead is at −24 volts and P is at ground), thereby shorting the oscillator through load resistors $R_3$ and $R_4$, effectively removing the enhanced tone from the line (diodes $D_6$ and $D_7$ are backward biased to "off" enhancing the 2600 hz tone).

After the duration of the detector time constant, transistor $Q_4$ opens, dropping the potential at point P to −24 volts through resistor $R_2$. This is the period before dialing commences. Transistor $Q_1$ is thereby opened and transistor $Q_5$ remains shorted to the time constant of the series capacitors allowing no signal to reach the line.

With the occurrence of the first dialing transient (when the M lead goes to ground), the detector again issues a signal (by going to ground) setting transistor $Q_1$ into the conducting condition; transistor $Q_5$ (switch B) opens, permitting the enhanced output of the oscillator to reach the line.

Since the time duration of the detector signal (ground) exceeds the time between pulses, point P will remain at ground for the dialing return period. Accordingly, $Q_1$ will remain shorted. Similarly diodes $D_6$ and $D_7$ will remain backward biased, thereby removing the attenuating effect of resistors $R_5$ and $R_6$ and enhancing the 2600 hz tone.

Transistor $Q_5$ (switch B) b w) will open and close with the dial pulses; being in the open condition upon the M lead being grounded, and closed upon it assuming −24 volts. The signal is enhanced by approximately 12 db over that occurring during an idle line. The parametric values are given hereinafter.

Upon the completion of dialing, talking may begin unaffected by the circuit described except for the introduction of amplifier 16 (including transistor $Q_2$) to obviate transformer insertion losses. When the conversation is concluded, the calling party replaces his receiver on hook, and a 150 msec. burst of high level tone is transmitted over the line. This condition is imposed since the "on hook" transient triggers transistor $Q_4$, point P goes to ground for 150 msec, and so on as previously described. After 150 msec. diodes $D_6$ and $D_7$ are forward biased introducing a muted tone on the line, indicating an idle line.

When the dial pulses have been transmitted by the inband signalling of the invention, and the called party's phone rings, via conventional office equipment, he lifts his receiver, thereby activating his M lead which cuts the tone toward the calling party, permitting the office equipment to recognize the establishment of the connection.

It will be appreciated by those versed in the art that additional resistors and capacitors are introduced in the circuit to provide the proper base emitter and collector voltages and introduce the necessary time constants. Zener and more conventional diodes are also introduced to isolate series circuits and protect transistors junctions.

For purposes of illustration, typical circuit parameters are listed below.

Resistors

| | |
|---|---|
| $R_1$ | 6.8 k ohms |
| $R_2$, $R_{25}$ | 1 k ohms |
| $R_3$, $R_4$, $R_{12}R_{13}R_{15}$ | 5.1 k ohms |
| $R_5$, $R_6$ | 510 k ohms |
| $R_7$ | 10 k ohms |
| $R_8$, $R_9$, $R_{10}R_{11}$ | 2.2 k ohms |
| $R_{14}$ | 3.9 k ohms |
| $R_{16}$ | 3.3 k ohms |
| $R_{17}$ | 7 k ohms |
| $R_{18}$ | 12 k ohms |
| $R_{19}$ | 2.4 k ohms |
| $R_{20}R_{21}$, $R_{27}$ | 4.7 k ohms |
| $R_{22}$ | 1.2 k ohms |
| $R_{23}$ | 24 k ohms |
| $R_{24}$ | 120 k ohms |
| $R_{26}$ | 1.5 k ohms |
| $R_{28}$ | 5.6 k ohms |
| $R_{29}$ | 200 ohm variable |

Capacitors

| | |
|---|---|
| $C_1$, $C_2$ | 22 $\mu f$ |
| $C_3$, $C_4$, $C_5$, $C_6$, $C_{11}$ | .1 $\mu f$ |
| $C_7$ | 47 $\mu f$ |
| $C_8$, $C_9$ | 10 $\mu f$ |
| $C_{10}$ | 4.7 $\mu f$ |
| $C_{12}$ | 45 $\mu f$ |

Diodes

| | |
|---|---|
| $D_1$, $D_2$, $D_3$, $D_4$ | IN 625 |
| $D_5$, $D_6$, $D_7$ | IN 914 |
| $D_8$ | 9.1 V |
| $D_9$ | 12 V |
| $D_{10}$ | 5.6 V |

Transistors

| | |
|---|---|
| $Q_1$ | MB80G |
| $Q_2$ | 2N930 |
| $Q_3$, $Q_4$ | MD6002 |
| 5 | S 2N2569 |

Transfom Transformers

| | |
|---|---|
| $T_1$ | 600:5400 |
| $T_2$ | 2400:600 |
| $T_3$ | 1:1 |

While the principles of the invention have been described in connection with specific apparatus, it is to be clearly understood that this description is made only by way of example and not as a limitation to the scope of the invention as set forth in the objects thereof and in the accompanying claims.

I claim:

1. A telephone signalling system for converting first and second DC signal voltage levels into inband AC signals between remote stations comprising:
   a. means for detecting a change between said DC voltage levels and issuing a signal of predetermined duration;
   b. a voice frequency path;
   c. an AC signal source normally coupled to said path;
   d. a switch, coupled to said detector means and responsive to the signal issuing therefrom for interrupting said voice frequency path at the input for the duration of said detector means signal; and
   e. means coupled between said signal source and said path and responsive to said detector means signal and one of said DC signal level voltages for enhancing said AC signal level over said path during the occurrence of said one DC signal level.

2 The telephone signalling system claimed in claim 1 wherein said enhancing means comprises means for enhancing said AC signal for the duration of said signal from said detector means, and means for interrupting said AC signal during the occurrence of the other of said DC voltage levels.

3. The telephone signalling system claimed in claim 2 wherein said enhancing means comprises an attenuator normally coupled between said AC signal source and said path, said enhancing means including means for effectively removing said attenuator means for the duration of said signal from said detector means.

4. The telephone signalling system claimed in claim 3 wherein said detector means signal time duration exceeds the time between dial pulses.

5. The telephone signalling system claimed in claim 4 wherein the attenuator means comprises a pair of diodes connected in push-pull and coupled across AC signal source and said switch including a transistor coupled the input to said path, said transistor and the center point of said diodes being coupled in common to said detector means.